July 23, 1929.  C. O. ASPENWALL  1,721,682
TRACTOR HITCH
Filed April 6, 1927  2 Sheets-Sheet 2
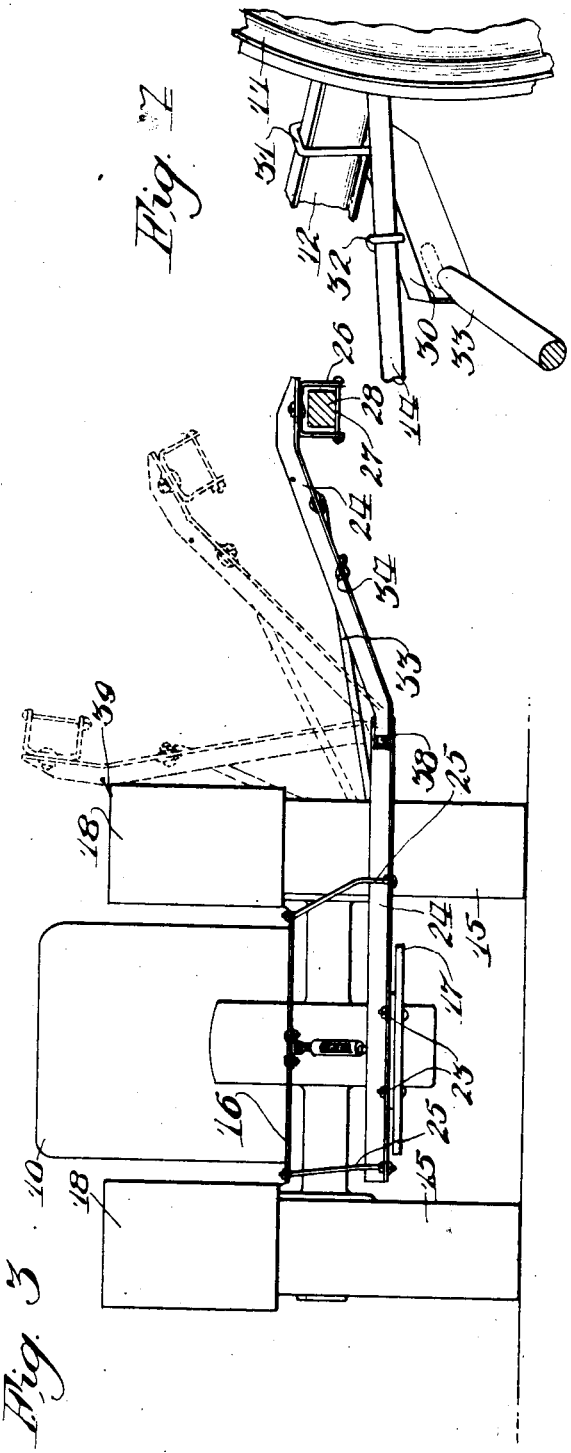
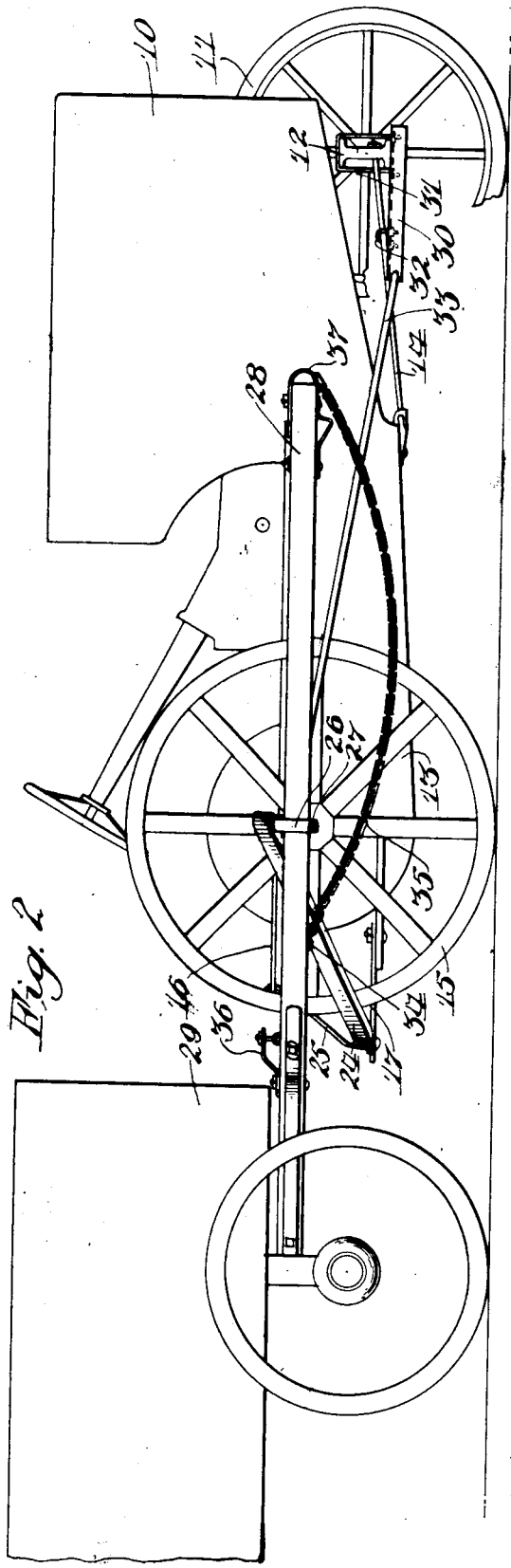
Inventor
Charles O. Aspenwall Patented July 23, 1929.

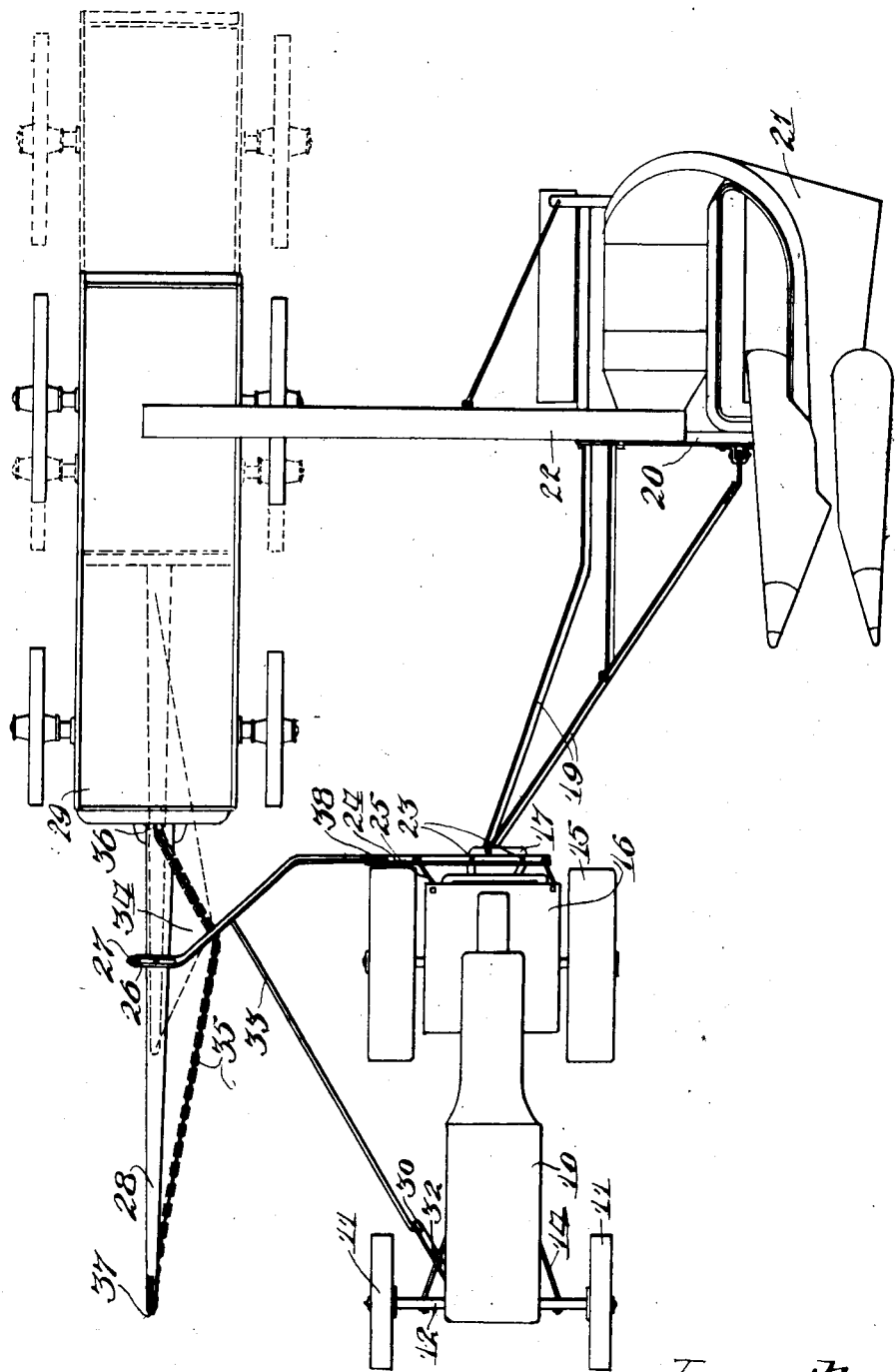

1,721,682

UNITED STATES PATENT OFFICE.

CHARLES O. ASPENWALL, OF HUBBARD WOODS, ILLINOIS, ASSIGNOR TO INTERNATIONAL HARVESTER COMPANY, A CORPORATION OF NEW JERSEY.

TRACTOR HITCH.

Application filed April 6, 1927. Serial No. 181,398.

The hitch of this invention broadly considered is designed for use with a tractor to enable the tractor to draw in offset trailing relationship on either side thereof, any kind of an implement or other transportable member, such hitch being adjunctive to the usual draw bar on the tractor.

More specifically considered this invention relates to a tractor hitch for drawing a wagon or the like alongside an implement, such as a corn picker. This arrangement will be shown and described as an illustrative embodiment of the invention.

The objects of the invention are to provide an improved and simplified tractor hitch of the kind stated, which will effectively maintain an implement or other transportable member such as the wagon at all times in proper trailing relationship to another implement such as the corn picker as well as to the tractor; to provide such a hitch in which the draft effort of the tractor will be properly applied to the offset transportable member so as to overcome any tendency to side draft; to provide such a hitch which may be easily and quickly attached to and detached from either side of the tractor; to provide such a hitch which may be folded against the tractor when not in use; and, lastly, generally to improve hitches for the purpose stated.

Briefly, in the corn picker embodiment herein shown, these very desirable objects are achieved in the provision of a laterally extending draft member rigidly carried on the drawbar of the tractor and extending in a stubbleward direction, said member being provided at its outer or free end with means for detachably receiving the draft pole or tongue of a trailing wagon. This lateral draft member has a rigid although foldable connection with the front end of the tractor, and a flexible connection with the front end of the wagon tongue, and another flexible connection with the rear end of said tongue. The tractor drawbar has connected thereto the usual rearwardly extending draft connections for pulling a corn picker or the like, which picker discharges the corn laterally into the trailing wagon connected to the tongue mentioned. The flexible connections from the lateral draft member to the tongue permit fore and aft adjustment of the wagon with respect to the corn picker, so that an even load may be discharged into the wagon, as will later more fully appear. When the hitch is not in use, it may be folded up alongside of the tractor.

In the accompanying sheets of drawings showing an illustrative embodiment of the invention,—

Figure 1 is an overall plan view of a tractor, pulled implement, and wagon, the improved hitch being associated therewith to maintain the proper relationship between the parts;

Figure 2 is a side elevational view as seen from the stubbleward side;

Figure 3 is a rear elevational view of the wagon hitch mounted on the tractor; and Figure 4 is a perspective detail view.

In the drawings, a tractor 10 is shown, the same embodying front wheels 11 carried on an axle 12 conventionally braced to the frame 13 by tie rods 14. The rear end of the tractor is carried on traction wheels 15 and is provided with an operator's platform 16, and a drawbar 17. Fenders or mud guards 18 are arranged over the wheels 15, as shown.

Pivotally connected to the drawbar 17 and extending diagonally rearwardly, in a grainward direction, is a draft connection 19 pivotally connected to the main frame 20 of an implement, such as the corn picker 21, which embodies a laterally extending discharge member or elevator 22.

The specific purpose of the invention is to provide a hitch which will permit the tractor to draw a work receiver or wagon in proper relationship to the picker 21, so that the same may receive ears of corn gathered by the picker from the discharge member 22, and, while doing this, properly transmit the draft forces to maintain a uniform relationship between the parts and overcome side draft. This improved wagon hitch will now be described.

Secured by bolts 23 to the drawbar is a laterally, stubblewardly and upwardly extending draft member 24, which is angularly bent forwardly at its outer end, as shown. This draft member in practice may be an angle iron bar, and may additionally be supported by means of hangers 25 secured to the operator's platform 16 on the tractor. The outer free end of this draft member 24 is removed a substantial distance from the tractor, where it carries a freely turnable, depending channel piece 26 carrying a bolt 27, as shown. This channel piece 26 slidably receives a draft tongue 28 connected to a work receiver or wagon 29. Thus, by sliding the wagon tongue 28 thru the channel piece 26 and across the bolt 27, which supports the tongue, it is possible to position said wagon in any desired fore and aft position relative to the discharge elevator 22 of the corn picker, with the result that an even load may be laid in the wagon.

The fore part of the tractor, or rather the axle 12, supports a short, rearwardly and diagonally outwardly extending, angle bar drawbar 30 by means of a clamp 31, said bar 30 also being secured by a U-bolt 32 to the adjacent tie rod 14 on the tractor, as shown, in Figure 4. Detachably but securely hooked into this draw angle bar 30 is a diagonally and rearwardly extending rigid draw link 33, which at its rear end is bolted fast to the tongue supporting lateral draft member 24. Adjacent the connection of this draw link to the lateral draft member, said lateral draft member carries a chain hook 34 to which an intermediate link of a chain 35 is connected, the rear end of said chain being connected detachably to a hook 36 at the rear end of the wagon tongue 28, while its front end is detachably connected to an eye 37 at the front end of said wagon tongue. It is to be noted that this rear chain portion is substantially in a line continuing thru the draw link 33. The outer portion of the tongue support or draft member 24 may be swung upwardly about a pivot 38 and be made fast to the adjacent wheel fender 18, by means of a hook 39, as best shown in Figure 3.

The operation and manner of use of the improved wagon hitch will now be described.

The tractor 10 has hitched thereto by the draw elements 19, the corn picker, or other implement, in the usual manner. The discharge member 22 of this implement extends a substantial distance in a stubbleward direction. It is desired to arrange a work receiver, or wagon, in a position to receive the ears of corn, or other material discharged by said member 22, and it is, furthermore, desired to have such wagon drawn by the tractor in proper relationship to the implement in a manner to overcome side draft. For this purpose, the tractor drawbar 17 carries the laterally extending tongue support and draft member 24, which at its free, outer end slidably receives, by means of the turnable channel member 26, the tongue 28 of the wagon. The fore part of the tractor carries the angle bar draw element 30, to which is detachably hooked the draw link 33 which at its rear end is made fast to the support 24. A chain 35 is utilized, as has been described, to pull the wagon and maintain the same in any desired, adjusted, fore and aft position with respect to the discharge elevator 22 of the adjacent implement 21. The rear portion of the chain 35, that is, that part thereof which connects the member 24 with the rear end of the wagon tongue, transmits the draft or pull of the draw link 33 directly to the wagon, as this chain part is substantially in line with said draw link 33. This front connection to the tractor overcomes any side draft developed in pulling the offset wagon. The drawbar 17 of the tractor, of course, also transmits its draft effort thru the member 24 to the rear chain part, as will be understood, to help in drawing the wagon. The front portion of the chain in practice will hang loosely, as shown in Figure 2, to prevent binding of the parts when the outfit is making a turn in the field.

At such times when the wagon hitch is not used, the same may be swung up, as shown in Figure 3, and be made fast to the adjacent wheel fender. This action will be permitted by the pivot 38 and the hooked connection of the link 33 to the member 30. Incidentally, in field work, where the ground is not level, the pivots mentioned permit the wagon tongue to float, as shown in Figure 3, which is a desirable feature of this construction.

Furthermore, it is an easy matter to attach and detach the wagon to or from the tractor. In practice, the tractor may always carry the draw angle iron 30 and the part of the member 24 inside of the pivot 38. Thus in attaching the hitch, it is merely necessary to hook the link 33, which in practice may be a pipe having a hooked end, to said angle part 30; and the outer end of the tongue support 24 is pivotally bolted to the inner part secured on the tractor drawbar. In removing the hitch, the part 33 and outer part of the member 24 are detached, and the hitch is off and out of the way, leaving the tractor free for other uses.

Obviously enough, the member 24 can be arranged on either side of the tractor, or two such members could be employed, one extending from each side. Instead of pulling a wagon, an implement or farm machine of any kind that is transportable could be pulled. For example a harrow could be trailed behind the tractor in offset trailing relationship, while the tractor drawbar could pull a plow instead of a corn picker.

From the above detailed description, it must now be clear that an improved hitch has been provided for the purposes stated, which achieves all of the desirable objects heretofore mentioned, and that the same is very simple and cheap to manufacture.

It is the intention to cover all such changes and modifications which do not materially depart from this invention, as is indicated in the subjoined claims.

What is claimed is:

1. The combination with a tractor and an implement drawn thereby, a transportable member having a draft tongue, of a hitch for drawing said transportable member by the tractor alongside the implement, said hitch comprising a laterally extending draft member carried by the rear part of the tractor, a swivel support carried by said draft member through which the draft tongue of the transportable member is passed to be supported thereby, a connection from the lateral draft member extending rearwardly to the transportable member, and a draw connection from the front part of the tractor to the lateral draft member.

2. The combination with a tractor and an implement drawn thereby, a transportable member having a draft tongue, of a hitch for drawing said transportable member by the tractor alongside the implement, said hitch comprising a laterally extending draft member carried by the rear part of the tractor, said member embodying a forwardly extending angular portion, means at the end of said portion for slidably supporting the draft tongue of the transportable member, a draw chain adjustably connecting the transportable member to said lateral draft member, and a rigid draw connection from the fore part of the tractor to said lateral draft member.

3. The combination with a tractor having a front axle and a drawbar, a trailing implement connected to said drawbar, a transportable member having a draft tongue, of a hitch for drawing said transportable member by the tractor alongside said implement, said hitch comprising a lateral draft member secured to the tractor drawbar and supporting the tongue of the transportable member, a draw connection from said lateral draft member to the transportable member, and a diagonal draw connection from the front tractor axle to said lateral draft member.

4. The combination with a tractor having a front axle and a drawbar, a trailing implement connected to said drawbar, a transportable member having a draft tongue, of a hitch for drawing said transportable member by the tractor alongside said implement, said hitch comprising a laterally and upwardly extending draft member provided with means for slidably supporting the tongue of the transportable member, an adjustable draw connection from the lateral draft member to the transportable member, and a draw connection from the tractor front axle to the lateral draft member.

5. The combination with a tractor having a front axle and a drawbar, a trailing implement connected to said drawbar, a transportable member having a draft tongue, of a hitch for drawing said transportable member by the tractor alongside said implement, said hitch comprising a lateral draft member carried by the tractor drawbar, said member including a forwardly bent part carrying turnable means for slidably receiving the draft tongue of the transportable member, an adjustable draw connection from said lateral draft member to the transportable member, and draw means connecting said lateral draft member to the front axle of the tractor.

6. The combination with a tractor having a front axle and a drawbar, a trailing implement connected to said drawbar, a transportable member having a draft tongue, of a hitch for drawing said transportable member by the tractor alongside said implement, said hitch comprising a lateral draft member carried on the tractor drawbar and supporting the tongue of the transportable member, a draw connection from the lateral draft member to said transportable member, a draw connection from the front tractor axle to said lateral draft member, and a pivot in the latter draw connection and the lateral draft member to permit a floating action of said parts.

7. A hitch for drawing a transportable member in offset trailing relationship to a tractor, said hitch comprising a bar adapted to be carried on the rear part of a tractor to extend laterally therefrom, a turnable tongue support on said bar, a draw connection extending forwardly of the bar and adapted for connection to the front end of a tractor, and a second draw connection carried adjustably by said bar adapted to be connected to a transportable member.

8. A hitch for drawing a member in offset trailing relationship to a tractor, said hitch comprising a bar adapted to be carried on the rear part of a tractor to extend laterally therefrom, said bar including an angularly bent portion, a tongue support at the end of said bar, a diagonally arranged draw link extending forwardly from the angular portion of said bar adapted for connection to the front end of a tractor, and a flexible draw element carried by said bar adapted for connection to a trailing member.

9. A hitch for drawing a member in offset trailing relationship to a tractor, said hitch comprising a bar adapted to be carried on the rear part of a tractor to extend laterally therefrom, a tongue support at the free end of said bar, a draw connection extending forwardly from the bar and made fast thereto, said draw connection adapted at its front end to be pivotally connected to the front part of a tractor, a rearwardly extending draw element carried by the bar adapted for connection to a trailing member, and means in the bar for permitting the hitch to be folded upwardly against a tractor when the hitch is not in use.

10. A hitch for drawing a wagon in offset trailing relationship to a tractor, said hitch comprising a bar adapted to be carried on the rear part of a tractor to extend laterally therefrom, a swivel support on the bar through which a tongue for the wagon slidably passes and is supported thereby, a connection from the forward part of the tractor to the bar, and means for fixing the position of the tongue in said swivel support.

In testimony whereof I affix my signature.

CHARLES O. ASPENWALL.